Dec. 10, 1963

G. B. PACKARD ETAL 3,113,725

VALVE CONTROLLED SPRAYING DEVICE FOR
A CHEMICAL INTERMIXED WITH WATER

Filed Sept. 7, 1962

INVENTORS
George B. Packard
Charles W. Monigle
BY Clayton L. Jenks
ATTORNEY

United States Patent Office 3,113,725
Patented Dec. 10, 1963

3,113,725
VALVE CONTROLLED SPRAYING DEVICE FOR A CHEMICAL INTERMIXED WITH WATER
George B. Packard, Shrewsbury, and Charles W. Monigle, Millbury, Mass., assignors to Barco Manufacturing Co., Inc., Worcester, Mass., a corporation of Massachusetts
Filed Sept. 7, 1962, Ser. No. 221,955
1 Claim. (Cl. 239—318)

This invention relates to a spraying device, and more particularly to a device for spraying water under pressure which, by an injector action, draws a chemical from a separate container and mixes it with the water.

Of the various uses to which such a device may be applied, one is that which requires the application of a stream of water to clean a wall surface, such as in a barn, after which an insecticide or other chemical is to be applied to a wall for sanitary purposes.

The primary object of this invention is to provide a spraying device with a valve control mechanism which may be readily adjusted and then locked in position for providing a stream of wash water free from chemical or which may be quickly moved to a chemical spraying position whereby fluid may be educted from a container and intermingled with the water spray.

Another object is to provide a check valve construction for preventing the escape of the chemical back into the incoming water stream which is delivered to the injection and spraying apparatus and thereby preventing contamination of the water in the public water supply system. Further objects will be apparent in the following disclosure:

Referring to the drawings illustrating a preferred embodiment of the invention:

Figure 1:
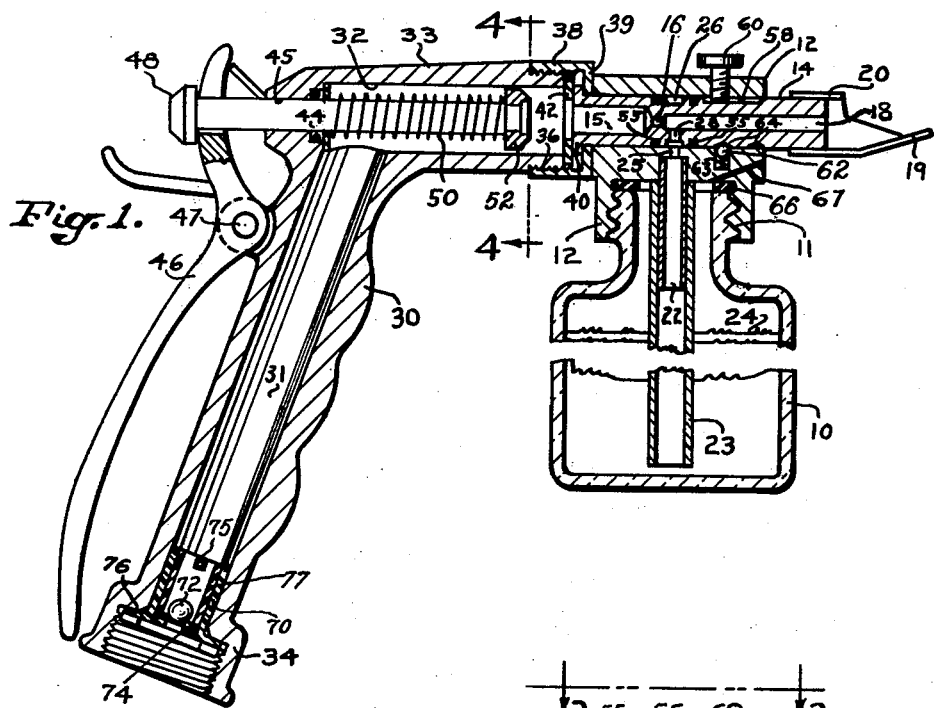
FIG. 1 is a vertical section, partly broken away, of the spray head and the attached container with the parts arranged for introducing a chemical into the water spray.

The device comprises a container 10 which is removably attached as by screw threads 11 to a head 12 which carries the spraying device. The head 12 has a horizontal cylindrical bore in which is mounted a substantially cylindrical nozzle tube 14 arranged for a limited sliding movement relative to the head. The tube 14 has a large cylindrical passage 15 communicating with a restricted continuous venturi orifice 16 opening in turn into a cylindrical exit passage 18. The outlet passage 18 is preferably smaller in diameter than the entrance 15 and the parts are suitably sized to provide the desired spray action. The tube 14 carries a water deflecting baffle 19 projecting into the path of the stream of water issuing from the tubular passage 18 so as to convert the cylindrical water stream into a spray. The baffle may be rotatably mounted on the end of the nozzle 14 by means of a spring clip 20 surrounding the end of the nozzle.

In order to introduce the chemical from the container 10 into the water stream, the head 12 is provided on its underside with a vertical tube 22 press fitted into a recess in the head. A further tube 23 leading from near the bottom of the container 10 is fitted tightly on that tube 22 in order to form a continuous vertical eductor passage for fluid 24 carried by the container. The head also has a small vertical passage 25 for transmitting fluid from the tube 22 to an outer annular recess 26 in the nozzle tube 14. A short passage 28 connects that recess 26 with the interior of the passage 18 in the nozzle. The passage 28 is located close to the constricted passage 16 to provide the venturi action. That is, the stream of water from the space 15 is driven by the water pressure at high speed through the constricted passage 16 and creates a partial vacuum adjacent to the outlet of the passage 28 and thus draws the chemical fluid upwardly into the nozzle passage 18.

Water is fed under pressure to the space 15 through a hollow handle 30 having a large bore 31 opening into a large cylindrical space 32 in the upper horizontal portion 33 of the handle. The lower end of the handle 30, which serves as a water supply tube, has an outwardly flared and internally threaded socket portion 34 into which the threaded end of a standard hose pipe may be connected for supplying water under pressure.

The front end of the handle body 33 has an external thread 36 threaded into the internal thread of hollow cap 38. That cap has an inwardly projecting flange 39 engaging an outwardly projecting flange 40 on the left-hand end of the nozzle tube body 14. A rubber or other suitable type of washer 42 fits inside of the cap against the flange 40, and the handle body 33 is drawn tightly against the washer by rotation of the cap 38.

Figure 4:
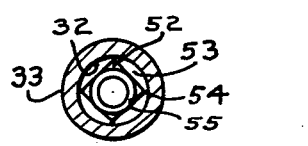
FIG. 4 is a section on the line 4—4 of FIG. 1.

A valve for controlling the water flow comprises a valve stem 44 mounted to slide through an opening 45 in the end of the upper handle body 33. A handle lever 46 of the first class is pivotally mounted at 47 on the handle 30. The stem 44 has a head 48 riding in an elongated slot in the lever, and the parts are so arranged that when the handle is pressed down, the valve stem will be moved against the action of a compression spring 50 to open the water passage. The spring surrounds the stem 44 and engages the handle at the left and the head 53 on the stem and thus urges the valve towards a closed position. The water flow is stopped by means of the valve head 52 which is slidable within the bore 32 of the handle 33. That head is substantially square in cross section (FIG. 4) and so provides passages 53 between the four slide surfaces 54 which ride within that tubular body cavity 32. Hence, water may flow through those passages 53 when the valve is open. The valve head 52 has an annular rib 55 concentric with the valve stem and with the washer 42 located at the end of the body 33. The rib 55 is larger in diameter than the central hole in the washer 42, so that when the head 52 and its rib 55 are thrust against the washer, no water can pass through the valve.

Various other valve mechanism may be suitably constructed for controlling the water flow.

The primary feature of this invention pertains to controlling the injection into the water stream of the chemical liquid 24 in the container 10. For this purpose, the nozzle tube 14 is fixed relative to the water supply tube 30 and so arranged that the water under pressure is always fed to the nozzle uniformly, but the head 12 which carries the container is formed as a sleeve slidably mounted on the tube 14, and the parts are so constructed that sliding movement of the head 12 serves to connect the eductor tube 22 with the injection exit passage 18 in the nozzle or to disconnect it therefrom and thereby control the egress of a definite supply of the chemical fluid 24 to the water spray without varying or interrupting the water flow. Two O rings 55 are located on opposite sides of the annular recess 26 in the tube 14. These O-rings prevent leakage of fluid between the tube and the head. When the tube 14 and the head 12 are in the relative positions shown in FIG. 1, the lateral passage 28 in the tube 14 communicates through the recess 26 with the exit passage 25 leading from the container. If, on the other hand, the head 12 and the tube 14 are relatively slid laterally into the position of FIG. 2, then the tube passage 25 leading from the container is out of communication with the passage 28 in the tube subjected to the partial vacuum provided by the venturi action. Thus, the water under pressure which flows through the nozzle 14 cannot draw the chemical upwardly into the nozzle spray.

Figure 2:
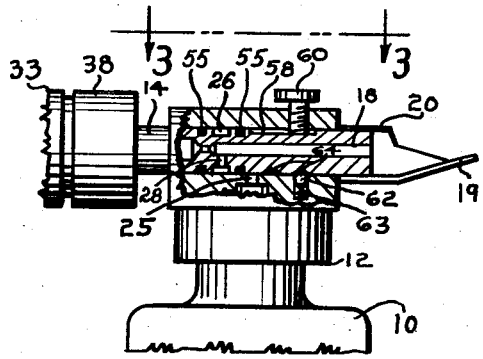
FIG. 2 is a fragmentary elevation, partly broken away, showing the valve parts in a position which prevents introducing the chemical into the spray.
Figure 3:
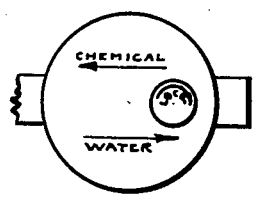
FIG. 3 is a top plan view taken on the line 3—3 of FIG. 2.

There are two structures shown for limiting the relative sliding motion of the parts 12 and 14. As shown, an external horizontal slot 58 of limited length is provided in the body of the tube 14, and a cap screw 60 is threaded through the head 12 in a position where its inner end may ride in the slot. The screw may engage one or the other end of that slot and so limit the relative sliding motion of the head on the tube. By threading the cap screw downwardly into frictional engagement with the tube 14, the parts 12 and 14 are held fixed in any desired end position, wherein chemical is fed according to the showing of FIG. 1 or is prevented from access to the water stream as shown in FIG. 2. Thus, the cap screw forms a stop member riding between two stops on the nozzle tube which limits the relative sliding movement of the head on the tube.

Another form of stop member for holding the head and spray tube in either an operative or an inoperative position, or for limiting the relative sliding motion of the parts 12 and 14, may comprise the spring pressed ball or detent 62 held by a spring 63 in a slot in the head 12. The ball is urged into one of two grooves 64 which are located for holding the spray tube 14 in either the "off" or the "on" position for feeding the chemical. Either the cap screw 60 or the spring pressed detent may be used alone for the purpose, and the parts may be reversely positioned on the head and tube as desired. Since the container is sealed against fluid leakage by a washer 66, an air passage 67 may be providde in the head for admitting air to the container as the liquid 24 is removed.

A check valve (FIG. 1) may be provided in the water tube which leads water to the venturi passage to prevent back flow of the container chemical into the water pipe system. It may comprise a cylindrical cup 70 made of a molded resinoid, such as nylon or polyethylene, which is fitted within the space 31 of the handle 30 or other part of a water inlet tube. The cup carries a ball 72 which may seat against a seat formed by the edge of a circular opening 74 in the bottom of the cup. The opening 74 is sized to provide an adequate water flow. A cross bar 75 at the opposite end of the cup prevents the ball from escaping. Various devices may be substituted for the cross bar to form an obstruction means which prevents escape of the ball and yet permits ready flow of the water. The ball is sufficiently small relative to the diameter of the passage within the cup so that the water flow is not obstructed materially. The cup 70 is shown as having a flange 76 which projects laterally within the outwardly flared socket 34 and so prevents the cup from being forced up the water tube. The obstruction 75 may be formed as an open bottomed resinoid cup 77 removably and reversely inserted and press fitted in the outer cup 70, as shown, which provides for assembly of the ball. The two cups 70 and 77 are reversely telescoped with their perforated ends in a spaced opposition between which the ball 72 is loosely mounted. The inner cup 77 has its end shaped as the cross bar 75 which is small enough to provide for water passage therearound. This double cup assembly is thus removably inserted in the water tube socket 34. The ball 72 may also be made of a molded resinoid similar to that of the cups.

Various other refinements may be incorporated in the device. Also, equivalent structures may be employed to satisfy the above specified purpose. Hence, the above disclosure of a preferred embodiment is not to be interpreted as imposing limitations on the accompanying claim.

What is claimed is:

A spraying device comprising a sleeve shaped head having an interior cylindrical wall, a spray nozzle tube having an exterior surface slidably fitted within said wall, said tube having an open outer end providing a spray exit and an uninterrupted venturi passage forming a constriction of and being substantially continuous with the inner surface of said tube, a handle and an associated water supply tube connected to the inlet end of said spray nozzle tube which leads water into said venturi passage and creates a partial vacuum at the exit end of said passage, a container for a chemical fluid removably threaded on and depending from said head, an eductor tube carried by the head for leading fluid from the container, said spray nozzle tube having a lateral opening at the exit end of the venturi passage which is subject to the partial vacuum created therein, said head having an opening communicating with said eductor tube which opening is alternatively connectable with or disconnected from said lateral opening by a sliding movement of the head on the spray nozzle tube between end positions, and locking means mounted on the head and engageable with said nozzle tube for holding the head fixed in either of said end positions whereby water may be sprayed with or without the chemical mixed therewith, said handle and its associated water supply tube constituting one manually engageable unit and said container and head constituting a second manually engageable unit, said units being so arranged that the flow of chemical fluid is controlled solely by manually sliding the head on the nozzle tube and without interrupting the water flow.

References Cited in the file of this patent

UNITED STATES PATENTS

| | | |
|---|---|---|
| 675,840 | Phillips | June 4, 1901 |
| 1,140,462 | Johnson | May 25, 1915 |
| 1,723,715 | Waters | Aug. 6, 1929 |
| 1,755,610 | Palmer | Apr. 22, 1930 |
| 1,794,186 | Trouillet | Feb. 24, 1931 |
| 2,135,969 | Donaldson | Nov. 8, 1938 |
| 2,388,445 | Stewart | Nov. 6, 1945 |
| 2,612,403 | Burch | Sept. 30, 1952 |
| 2,814,528 | Blasczyk | Nov. 26, 1957 |
| 2,952,412 | Munson | Sept. 13, 1960 |
| 2,991,939 | Packard | July 11, 1961 |
| 3,034,731 | Chapin | May 15, 1962 |
| 3,052,417 | Daniel | Sept. 4, 1962 |